July 7, 1936.  L. G. PICKHAVER  2,046,966
ARC WELDING
Filed Dec. 28, 1934
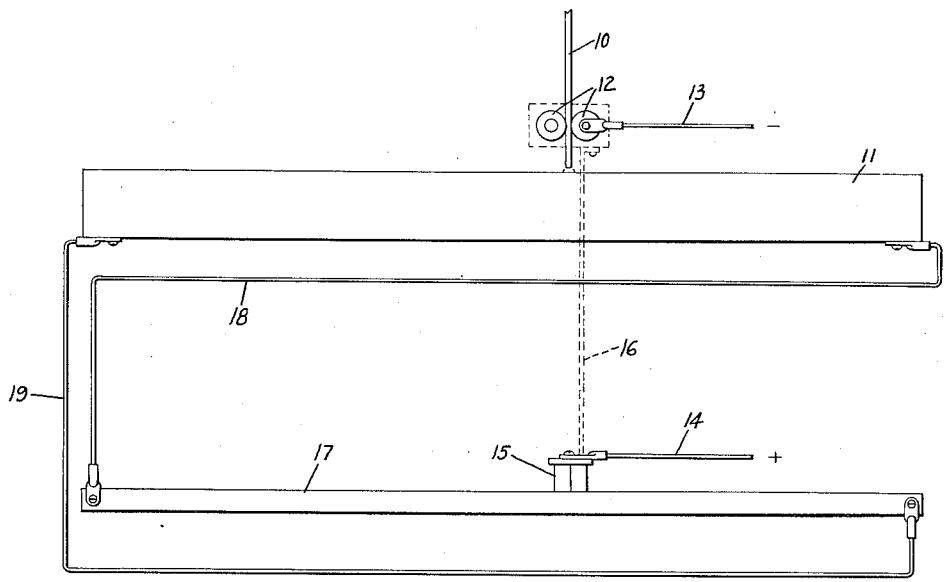
Inventor:
Lionel G. Pickhaver,
by Harry E. Dunham
His Attorney.

Patented July 7, 1936

2,046,966

UNITED STATES PATENT OFFICE 2,046,966

ARC WELDING

Lionel G. Pickhaver, Chicago, Ill., assignor to General Electric Company, a corporation of New York Application December 28, 1934, Serial No. 759,507

5 Claims. (Cl. 219—8)

My invention relates to arc welding, and more particularly to automatic arc welding apparatus in which means are provided for traversing a welding arc and the work to be welded relatively to one another to perform a welding operation.

During welding the action of the welding arc as well as the condition of the deposited weld metal is influenced to a marked degree by the magnetic disturbances which occur due to the direction and magnitude of the flow of welding current to the arc through the work and work clamps. These magnetic disturbances are in a great measure controlled by the location of the connection of the work, or the work clamps in the welding circuit.

It is an object of my invention to provide in an automatic arc welding machine means responsive to the relative traversing motion between the electrode and the work for controlling the flow of welding current through the work in the proper manner to avoid disturbing magnetic influences.

It is a further object of my invention to provide in an automatic arc welding apparatus in which the arc and the work are traversed relative to one another to perform a welding operation, means controlled by the traversing means for continuously supplying to the arc substantially equal quantities of welding current from opposite directions through the work.

Further objects of my invention will become apparent from a consideration of the following description taken in connection with the accompanying drawing which diagrammatically represents one embodiment of my invention.

The diagrammatic representation in the drawing illustrates an automatic arc welding machine in which a welding electrode 10 is traversed relatively to the work 11 during the welding operation. The electrode 10 is fed toward and from the work to strike and thereafter maintain an arc by automatic means comprising feed rolls 12 which engage the electrode and supply welding current thereto. One or both of these feed rolls is connected to one terminal of a source of welding current through a conductor 13. The other terminal of the source of welding current is connected to the work through a conductor 14. This conductor is electrically connected to a sliding contact 15 which is mechanically connected through a connection 16 to the mechanism employed for traversing the electrode 10 relatively to the work 11. This contact engages and is moved along a resistor 17 with the same relative traversing movement that the electrode 10 makes relatively to the work 11 due to the mechanical connection between these parts. The opposite ends of the resistor 17 are cross connected through conductors 18 and 19 to the ends of the work 11 at the extremities of the path of travel of the welding electrode over the work.

In the embodiment illustrated the resistor 17 is equal in length to the path of travel of the electrode 10 along the work 11 and has a resistance approximately equal to that of the work. Welding current is thus supplied to the welding arc established between the electrode 10 and the work 11 through two parallel paths of equal resistance throughout the whole welding operation. The increased resistance to the flow of welding current from one end of the work to the arc as the welding operation progresses is neutralized by the decrease in resistance in the circuit through the resistor 17 which takes place as the welding operation proceeds. Likewise, the decrease in resistance to the flow of welding current from the other end of the work as the welding operation progresses is neutralized by the increase in resistance of the circuit through the other portion of the resistor 17. It will thus be seen that the circuit arrangement provided establishes parallel circuits to the arc which maintain an equal distribution of current due to the changes in resistance values in the work and in the resistor which take place as the welding arc is traversed over the work. Under these conditions it is apparent that the welding current is supplied to the arc in equal quantities from each end of the work and set up magnetic fields which are approximately equal and, consequently, practically eliminate any unbalanced magnetic condition which would cause the arc to blow in one direction or the other depending upon the magnitude of the magnetic field on either side of the arc.

It is apparent that instead of making the welding current connections directly to the ends of the work these connections can be made through the ends of a backing bar upon which the work is supported and still accomplish the same results. It is also apparent that under certain conditions the welding current need not be supplied in substantially equal quantities from opposite directions through the work during the welding operation. Various arrangements for accomplishing an unequal flow of current will readily occur to those skilled in the art. For example, the resistor 17 may be so constructed as to accomplish the desired division of welding current supplied to the arc from the opposite ends of its path of travel over the work. Since the resistor and its connections to the work constitute parallel circuits of adjustable resistance which are simultaneously adjusted during the traversing motion of the electrode and the work, it is also apparent that one or more rheostats with suitable controls responsive to the relative movement of the electrode and the work may be used for accomplishing my intended purpose. These and other modifications will occur to those skilled in the art, and I aim, therefore, to cover by the appended claims all such modifications and variations as fall within the true spirit and scope of my invention.

What I claim as new and desire to secure by Letters Patent of the United States is:

1. Arc welding apparatus comprising means for traversing a welding electrode and the work to be welded relatively to one another along a predetermined path of travel, a source of welding current, means for connecting said electrode to one terminal of said source of welding current, parallel circuits of adjustable resistance connected to the work, one terminal of each of which is connected to the work at the opposite ends of said path of travel and the other terminal of each of which is connected to the other terminal of the source of supply, and means responsive to the traversing motion between the electrode and the work for simultaneously adjusting the resistances of said parallel circuits.

2. Arc welding apparatus comprising means for traversing a welding electrode and the work to be welded relatively to one another along a predetermined path of travel, a resistor, means for cross connecting the ends of said resistor and the ends of said work at the extremities of said path of travel, a contact making sliding engagement with said resistor, means for producing the same relative traversing movement between said contact and said resistor that occurs between the electrode and the work, and means for supplying welding current to the electrode and to said contact.

3. Arc welding apparatus comprising means for traversing a welding electrode and the work to be welded relatively to one another along a predetermined path of travel, a resistor having a resistance approximately equal to the resistance of the work between the extremities of said path of travel, means for connecting the ends of said resistor to the ends of said work at the extremities of said path of travel, a contact making sliding engagement with said resistor, means for supplying welding current to said electrode and to said contact, and means responsive to the traversing motion between the electrode and the work for producing a traversing movement between said contact and said resistor which substantially equalizes the resistances of the parallel circuits between said electrode and contact.

4. Arc welding apparatus comprising means for traversing a welding electrode and the work to be welded relatively to one another along a predetermined path of travel, a resistor having a resistance approximately equal to that of the work, means for cross connecting the ends of said resistor and the ends of said work at the extremities of said path of travel, a contact making sliding engagement with said resistor, means for producing the same relative traversing movement between said contact and said resistor that occurs between the electrode and the work, and means for supplying welding current to the electrode and to said contact.

5. Arc welding apparatus comprising means for traversing a welding electrode and the work to be welded relatively to one another along a predetermined path of travel, a conductor equal in length to said path of travel and having a resistance approximately equal to that of the work, electrically conductive means for cross connecting the ends of said conductor with the ends of the work at the extremities of said path of travel, a contact making a sliding engagement with said conductor, means responsive to the relative traversing movement of said electrode and the work for producing a relatively equal traversing movement between said contact and said resistor, and means for supplying welding current to the electrode and to said contact.

LIONEL G. PICKHAVER.